US012427585B2

(12) United States Patent
Haruna

(10) Patent No.: US 12,427,585 B2
(45) Date of Patent: Sep. 30, 2025

(54) ELEMENT CHANGER

(71) Applicant: KOSMEK LTD., Kobe (JP)

(72) Inventor: Yosuke Haruna, Kobe (JP)

(73) Assignee: KOSMEK LTD., Kobe (JP)

( * ) Notice: Subject to any disclaimer, the term of this patent is extended or adjusted under 35 U.S.C. 154(b) by 895 days.

(21) Appl. No.: 17/606,781

(22) PCT Filed: Apr. 23, 2020

(86) PCT No.: PCT/JP2020/017415
§ 371 (c)(1),
(2) Date: Oct. 18, 2022

(87) PCT Pub. No.: WO2020/226060
PCT Pub. Date: Nov. 12, 2020

(65) Prior Publication Data
US 2023/0045082 A1    Feb. 9, 2023

(30) Foreign Application Priority Data
May 8, 2019   (JP) ................. 2019-088360

(51) Int. Cl.
*B23B 31/107* (2006.01)
*B25J 15/00* (2006.01)
*B25J 15/04* (2006.01)

(52) U.S. Cl.
CPC ..... *B23B 31/10741* (2021.01); *B25J 15/0047* (2013.01); *B25J 15/0408* (2013.01); *Y10T 279/17761* (2015.01)

(58) Field of Classification Search
CPC .............. B23B 31/10741; B23B 31/107; B25J 15/0047; B25J 15/0408; B25J 15/0458; Y10T 279/17761; Y10T 279/17666; B23Q 3/15506
See application file for complete search history.

(56) References Cited

U.S. PATENT DOCUMENTS

| | | |
|---|---|---|
| 4,850,765 A | 7/1989 | Ramunas |
| 6,247,999 B1 | 6/2001 | Tokiwa |
| 9,964,156 B2 * | 5/2018 | Wong ................ B23B 31/10741 |

FOREIGN PATENT DOCUMENTS

| | | | |
|---|---|---|---|
| JP | 2008-272875 A | 11/2008 | |
| KR | 20180121752 A | * 11/2018 | |

OTHER PUBLICATIONS

KR-20180121752-A Translation (Year: 2018).*
Search Report dated Apr. 7, 2020, issued in corresponding International application No. PCT/JP2020/003436.
(Continued)

*Primary Examiner* — Sunil K Singh
*Assistant Examiner* — Dustin James Trujillo
(74) *Attorney, Agent, or Firm* — BACON & THOMAS, PLLC

(57) ABSTRACT

An element changer includes a plurality of operation pin members (4) inserted in a housing (3). Each of the operation pin members (4) has a wedge surface (12c). When the operation pin members (4) are pushed into the housing (3), each wedge surface (12c) is disengaged from an engaging portion (10a) provided at a leading end portion of a tubular wall portion (10) of a tool plate (2) or of a connection plate (1). This allows a tool (5) functioning as a second element to be detached from a robot arm (8) functioning as a first element.

8 Claims, 13 Drawing Sheets

(56) References Cited

OTHER PUBLICATIONS

Search Report dated Jun. 7, 2022, issued in corresponding European application No. 20801447.2.
Search Report dated Jul. 14, 2020, issued in corresponding international application No. PCT/JP2020/017415.

* cited by examiner

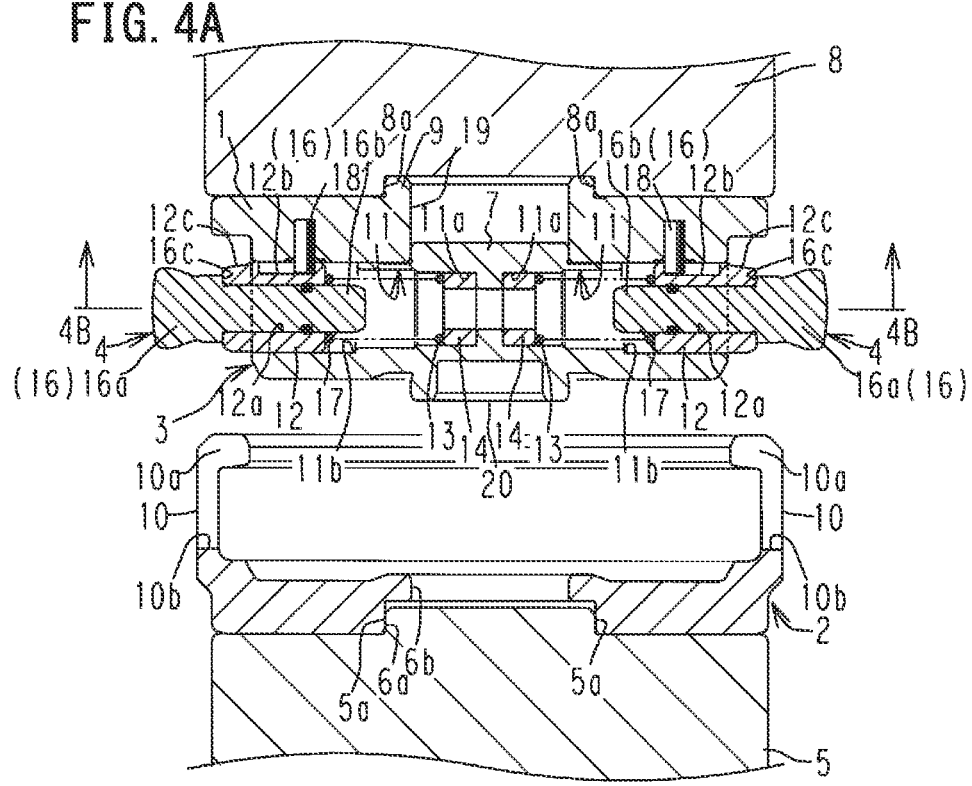
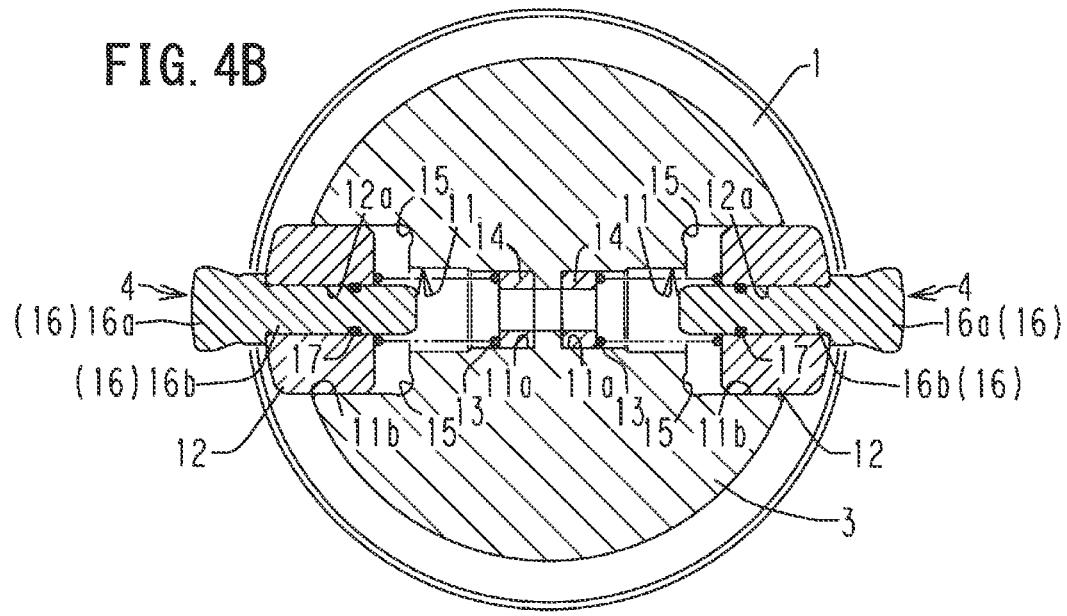

ELEMENT CHANGER

TECHNICAL FIELD

The present invention relates to an element changer used to change an element such as a machine tool, clamp, pallet, jig, and an object to be subjected to a machining process, by attaching/detaching the element to/from another element such as a robot arm, a movable portion of a conveyor machine, and a table functioning as a stationary stand.

BACKGROUND ART

Known examples of such an element changer include a device described in Patent Literature 1 specified below. The known device is structured as follows. The tool changer described in Patent Literature 1 is used to change a tool such as a jig, machine tool and clamp by manually attaching/detaching the tool to/from a handling main body mechanism such as a jig station and a robot arm. The tool changer includes: an L-shaped connector having a semicircular engagement recess; and a camshaft having an engagement cam configured to be engaged in the engagement recess. The camshaft is rotated by rotating a handle attached to an end of the camshaft. The rotation of the camshaft causes the engagement cam to be engaged in/disengaged from the engagement recess.

CITATION LIST

Patent Literature

Patent Literature 1: Japanese Unexamined Patent Publication No. 2008-272875

SUMMARY OF INVENTION

Technical Problem

The device described in Patent Literature 1 has the following disadvantages.

The handle to rotate the camshaft is necessary for the tool changer described in Patent Literature 1. If the handle is always attached to the camshaft, the handle may disturb the operation of a tool attached to the handling main body mechanism, for example. If the handle is detached from the camshaft after use and is used only at the time of changing a tool, it is necessary to appropriately store the unused handle.

An object of the present invention is to provide an element changer configured so that an element can be changed without using a handle.

Solution to Problem

In order to achieve the above object, in an aspect of the present invention, an element changer is structured as follows, as shown in FIG. 1A to FIG. 6, for example.

An element changer of this aspect includes: a first plate 1 configured to be attached to a first element 8; a second plate 2 configured to be attached to a second element 5, the second plate 2 including a tubular wall portion 10 extending from an outer peripheral edge portion of the second plate 2 in its axial direction; a housing 3 configured to be attached to the first element 8 via the first plate 1, the housing 3 having a diameter smaller than that of the second plate 2; a plurality of operation pin members 4 inserted in the housing 3, each of the pin members 4 having a wedge surface 12c on a side close to the first plate 1; and a biasing means 13 provided in the housing 3, the biasing means 13 being configured to bias the operation pin members 4 outward in a radial direction of the housing 3. An engaging portion 10a is provided at a leading end portion of the tubular wall portion 10 in its axial direction, and the engaging portion 10a protrudes inward in a radial direction of the tubular wall portion 10. When the operation pin members 4 are pushed into the housing 3 against a biasing force of the biasing means 13, each wedge surface 12c is disengaged from the engaging portion 10a, to allow the second element 5 to be detached from the first element 8.

The above-described element changer of this aspect provides the following functions and effects.

The detachment of the second element is allowed with the pushing of the operation pin members into the housing. Thus, it is possible to change the second element without using a handle.

The element changer of the above aspect may be arranged such that: as shown in FIG. 5A and FIG. 5B, for example, a protrusion 20 is provided at a central portion of the housing 3; a recess 6b, in which the protrusion 20 is to be fitted, is provided at a central portion of the second plate 2; and a positioning pin 22 configured to be fitted in a pin hole 21 of the second plate 2 is provided so as to protrude from the housing 3, the pin hole 21 being provided at a portion of the second plate 2, which is not its central portion.

In this arrangement, the position of the second plate in the circumferential direction relative to the housing is always the same. As a result, the position of the second element relative to the first element, at which the second element is attached via the element changer, is determined with respect to the circumferential direction.

Furthermore, the element changer of the above aspect may be arranged as follows. A leading end portion 23 of the positioning pin 22 has a shape such that: when fitted in the pin hole 21, the leading end portion 23 is in contact with an inner wall surface of the pin hole 21 in a circumferential direction of the second plate 2; and one or more gaps are created between the leading end portion 23 and the inner wall surface of the pin hole 21 in a radial direction of the second plate 2.

This arrangement improves the accuracy of the position of a tool in the circumferential direction relative to the first element, at which the tool is attached via the element changer.

In another aspect of the invention, an element changer as shown in FIG. 7A to FIG. 11B, for example, is provided.

An element changer of this aspect includes: a first plate 1 configured to be attached to a first element 8, the first plate 1 including a tubular wall portion 10 extending from an outer peripheral edge portion of the first plate 1 in its axial direction; a second plate 2 configured to be attached to a second element 5; a housing 3 configured to be attached to the second element 5 via the second plate 2, the housing 3 having a diameter smaller than that of the first plate 1; a plurality of operation pin members 4 inserted in the housing 3, each of the pin members 4 having a wedge surface 12c on a side close to the second plate 2; and a biasing means 13 provided in the housing 3, the biasing means 13 being configured to bias the operation pin members 4 outward in a radial direction of the housing 3. An engaging portion 10a is provided at a leading end portion of the tubular wall portion 10 in its axial direction, and the engaging portion 10a protrudes inward in a radial direction of the tubular wall portion 10. When the operation pin members 4 are pushed into the housing 3 against a biasing force of the biasing means 13, each wedge surface 12c is disengaged from the engaging portion 10a, to allow the second element 5 to be detached from the first element 8.

The above-described element changer of this aspect provides the following functions and effects.

The detachment of the second element is allowed with the pushing of the operation pin members into the housing. Thus, it is possible to change the second element without using a handle.

The element changer of the above aspect may be arranged such that: as shown in FIG. 11A and FIG. 11B, for example, a protrusion 20 is provided at a central portion of the housing 3; a recess 19, in which the protrusion 20 is to be fitted, is provided at a central portion of the first plate 1; and a positioning pin 22 configured to be fitted in a pin hole 21 of the first plate 1 is provided so as to protrude from the housing 3, the pin hole 21 being provided at a portion of the first plate 1, which is not its central portion.

In this arrangement, the position of the first plate in the circumferential direction relative to the housing is always the same. As a result, the position of the second element relative to the first element, at which the second element is attached via the element changer, is determined with respect to the circumferential direction.

Furthermore, the element changer of the above aspect may be arranged as follows. A leading end portion 23 of the positioning pin 22 has a shape such that: when fitted in the pin hole 21, the leading end portion 23 is in contact with an inner wall surface of the pin hole 21 in a circumferential direction of the first plate 1; and one or more gaps are created between the leading end portion 23 and the inner wall surface of the pin hole 21 in a radial direction of the first plate 1.

This arrangement improves the accuracy of the position of the second element in the circumferential direction relative to the first element, at which the second element is attached via the element changer.

Furthermore, the element changer of each aspect may be arranged as follows. Each of the operation pin members 4 includes: a wedge member 12 on which the wedge surface 12c is provided; an operation pin 16 inserted in a tubular hole 12a provided in the wedge member 12; and an annular elastic member 17 attached between the operation pin 16 and the wedge member 12.

In this arrangement, each operation pin member can be easily produced.

Advantageous Effects of Invention

According to embodiments of the element changer of the present invention, it is possible to change an element (second element) without using a handle.

BRIEF DESCRIPTION OF THE DRAWINGS

FIG. 2A is a diagram corresponding to FIG. 1A and showing a state in which operation pin members shown in FIG. 1A have been pushed in.

FIG. 4A is a diagram corresponding to FIG. 1A and showing a state in which the operation pin members shown in FIG. 3A have moved outward in a radial direction of a housing.

FIG. 4B is a cross section taken along a line 4B-4B in FIG. 4A.

FIG. 8A is a diagram corresponding to FIG. 7A and showing a state in which operation pin members shown in FIG. 7A have been pushed in.

DESCRIPTION OF EMBODIMENTS

FIG. 1A to FIG. 6 show a first embodiment of the present invention. A tool changer serving as an element changer is used to attach/detach a tool 5, functioning as a second element such as a machine tool, clamp, pallet, and jig, to/from a robot arm 8 functioning as a first element. The tool changer is configured as follows, for example.

Figure 1A:
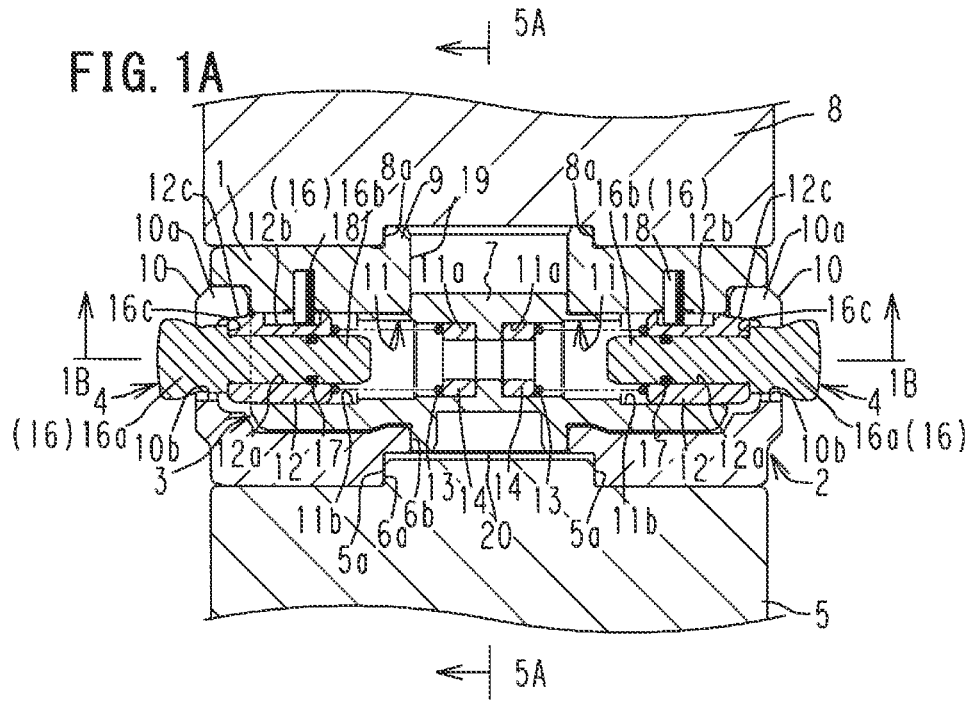
FIG. 1A shows a first embodiment of the present invention, and is a cross section of an element changer (a tool changer) along its axial direction, through which a second element (tool) has been attached to a first element (robot arm).

As shown in FIG. 1A, for example, the tool changer includes: a connection plate 1 functioning as a first plate; a tool plate 2 functioning as a second plate; a housing 3; and a plurality of operation pin members 4.

A protrusion 9 provided at a central portion of an upper surface of the connection plate 1 is fitted in a recess 8a provided at a distal end portion of the robot arm 8. The connection plate 1 has, at its central portion, a tubular hole 19 concentric with the protrusion 9. A protrusion 7 provided at a central portion of a top surface of the housing 3 is fitted in the tubular hole 19, and the housing 3 is attached to the robot arm 8 with a bolt or the like (not shown) via the connection plate 1.

Meanwhile, a recess 6a provided at a central portion of a lower surface of the tool plate 2 is fitted over a protrusion 5a at a base end portion of the tool 5, and the tool plate 2 is attached to the tool 5 with a bolt or the like (not shown). The tool plate 2 includes a tubular wall portion 10 extending from an outer peripheral edge portion of the tool plate 2 in its axial direction.

The housing 3 has a diameter smaller than that of the tool plate 2. In the housing 3, there are accommodation spaces 11, in which the operation pin members 4 are respectively disposed. Each accommodation space 11 is a hollow space extending from an outer peripheral surface of the housing 3 toward a central portion of the housing 3. Each has a small-diameter portion 11a close to the central portion of the housing 3, and a widened portion 11b close to the outer peripheral surface of the housing 3. In this embodiment, two accommodation spaces 11 are arranged in a straight line. The two accommodation spaces 11 communicate with each other in this embodiment, but do not have to communicate with each other.

Each operation pin member 4 includes a wedge member 12, which is disposed in the corresponding widened portion 11b. Springs 13 (coil springs), functioning as a biasing means configured to bias the operation pin members 4 (wedge members 12) outward in the radial direction of the housing 3, are disposed in the respective accommodation spaces 11. Furthermore, a tubular spring seat 14 is disposed in each small-diameter portion 11a to receive the corresponding spring 13. Each inner-side corner portion 15 of each widened portion 11b is a hollow portion of an arc shape protruding outward.

Each operation pin member 4 includes: the wedge member 12; and an operation pin 16 inserted in a tubular hole 12a provided in the wedge member 12. The operation pin 16 includes a pin head portion 16a, a pin portion 16b having a diameter smaller than that of the pin head portion 16a, and a step portion 16c between the pin head portion 16a and the pin portion 16b. The step portion 16c prevents the corresponding wedge member 12 from falling out of the operation pin 16 in a direction toward the pin head portion 16a. An O ring 17 functioning as an annular elastic member is attached between the pin portion 16b and the wedge member 12. The O ring 17 functions to prevent the operation pin 16 from coming out of the tubular hole 12a of the wedge member 12.

Retainer pins 18 are provided to protrude from a lower surface of the connection plate 1. A head portion of each retainer pin 18 is in a groove 12b provided on a top surface of the corresponding wedge member 12. Each wedge member 12 has a wedge surface 12c provided on its top surface (surface close to the connection plate 1). The wedge surface 12c is configured to be engaged with an engaging portion 10a of the tubular wall portion 10. The engaging portion 10a is provided at a leading end portion of the tubular wall portion 10 in its axial direction and protrudes inward in the radial direction of the tubular wall portion 10.

Figure 6:
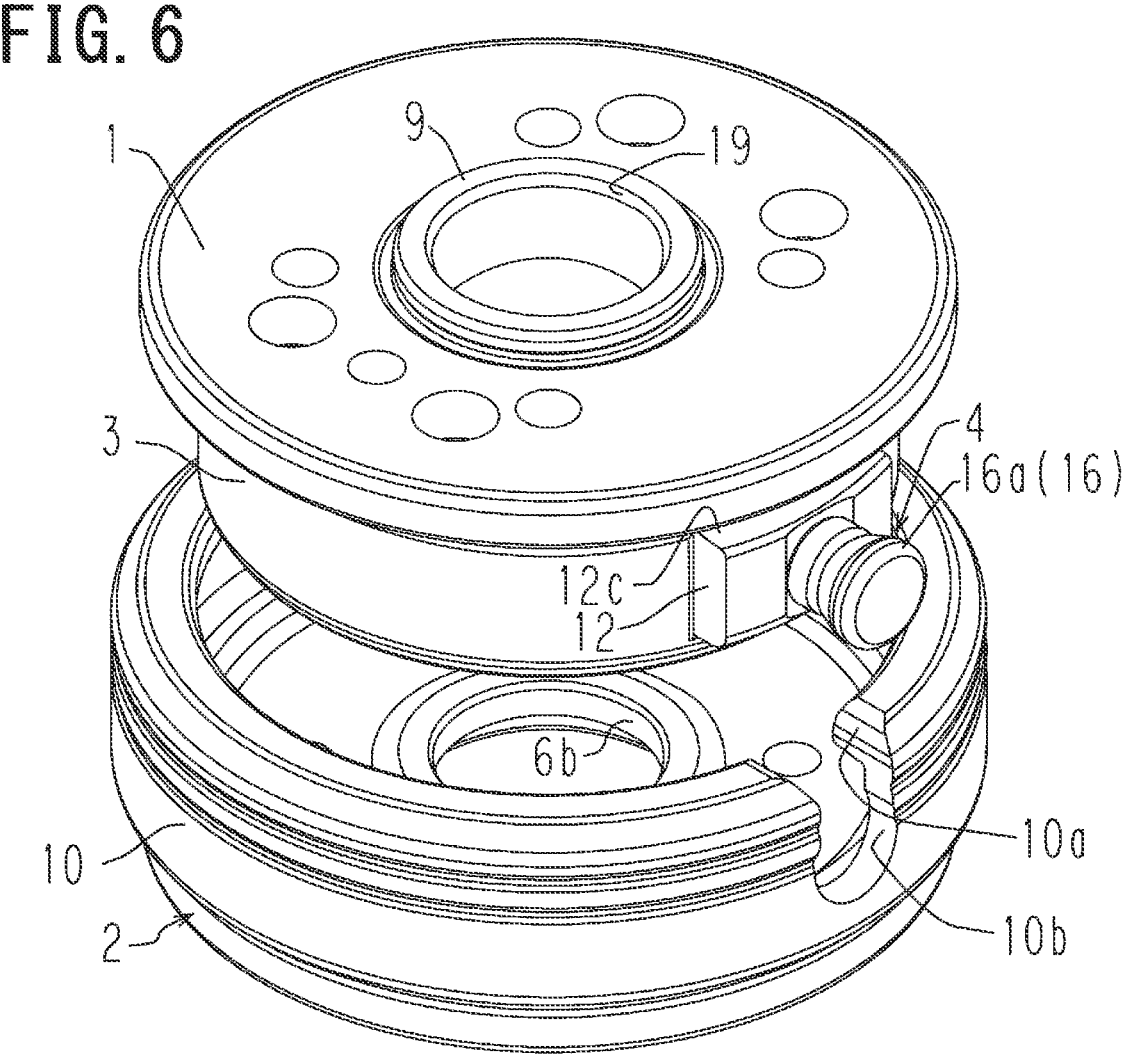
FIG. 6 is a perspective view of the element changer (tool changer) shown in FIG. 4A.

As shown in FIG. 6, for example, the tubular wall portion 10 has U-shaped notches 10b. Each operation pin 16 protrudes from the housing 3 outward in its radial direction beyond the corresponding notch 10b.

Furthermore, the tool plate 2 has, at a central portion of its upper surface, a hole 6b (recess), which is concentric with the recess 6a. A protrusion 20 provided at a central portion of an under surface of the housing 3 is fitted in the hole 6b.

Figure 5A:
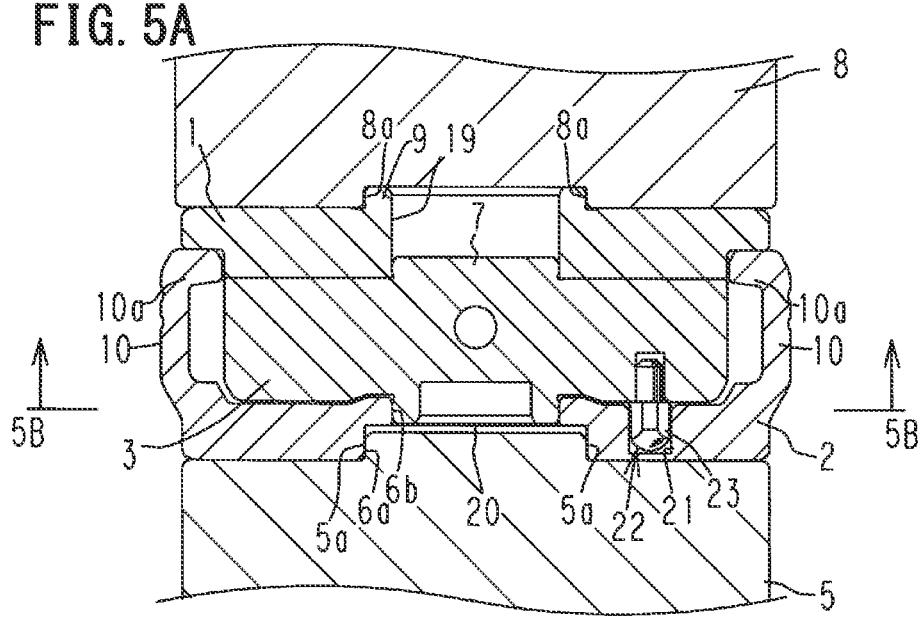
FIG. 5A is a cross section taken along a line 5A-5A in FIG. 1A.
Figure 5B:
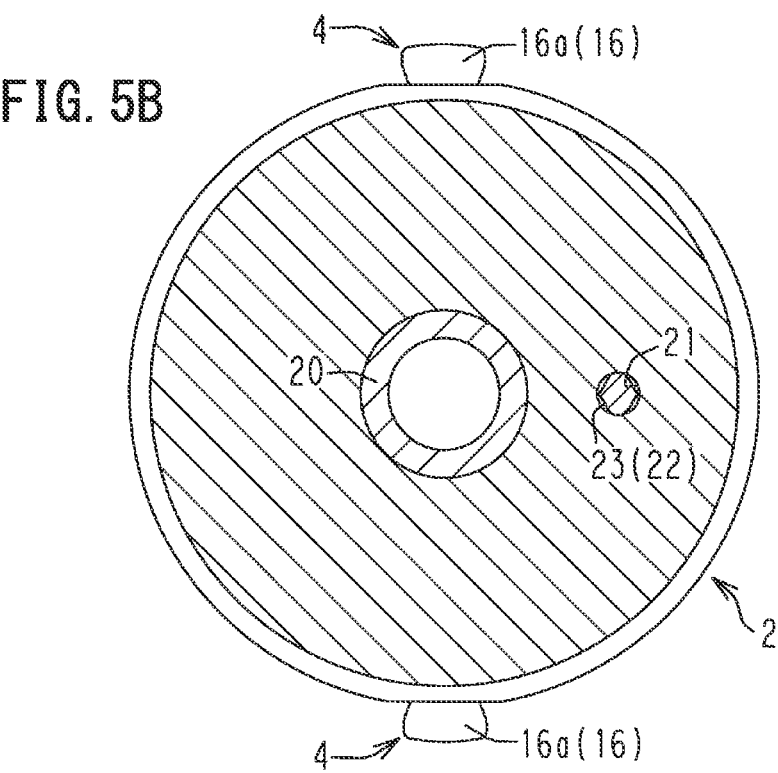
FIG. 5B is a cross section taken along a line 5B-5B in FIG. 5A.

As shown in FIG. 5A and FIG. 5B, the tool plate 2 has a pin hole 21 at a portion different from its central portion. A positioning pin 22 configured to be fitted in the pin hole 21 is provided on the under surface of the housing 3 so as to protrude.

A leading end portion 23 of the positioning pin 22 has a shape such that: its four peripheral portions are cut away; and the leading end portion 23 is in contact with an inner wall surface of the pin hole 21 in the circumferential direction of the tool plate 2 while small gaps are created between the leading end portion 23 and the inner wall surface of the pin hole 21 in a radial direction of the tool plate 2.

The tool changer having the above-described structure operates as follows.

Figure 1B:
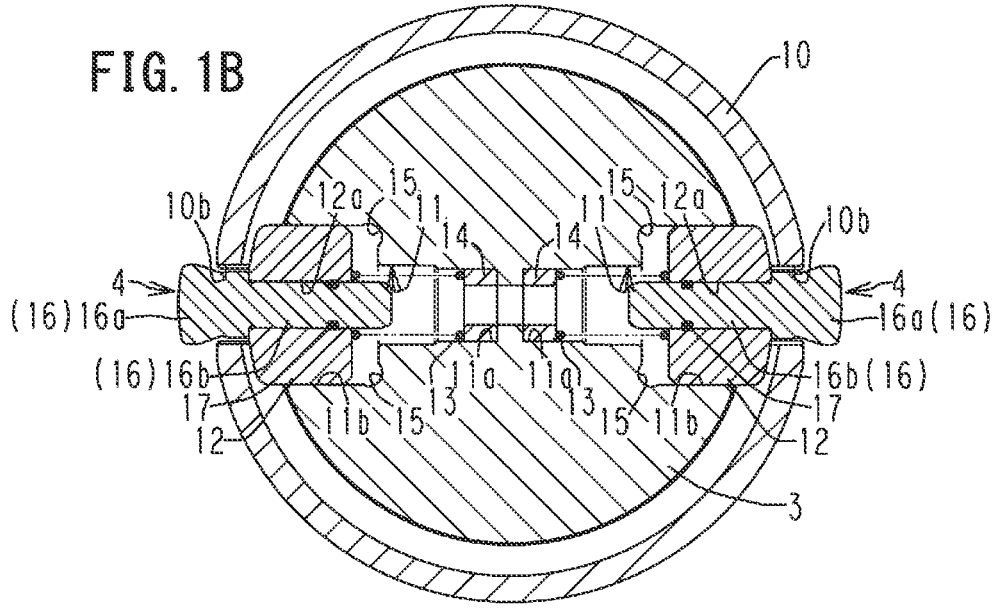
FIG. 1B is a cross section taken along a line 1B-1B in FIG. 1A.

In a lock state shown in FIG. 1A and FIG. 1B, in which the tool 5 has been attached to the robot arm 8, the two operation pin members 4 have been moved outward in the radial direction of the housing 3 by the biasing force of the springs 13, and the wedge surface 12c of each wedge member 12 is engaged with the engaging portion 10a provided at the leading end portion of the tubular wall portion 10 of the tool plate 2. In this state, the wedge surfaces 12c, inclined relative to the direction in which the springs 13 expand and contract, push the engaging portion 10a of the tubular wall portion 10 toward the connection plate 1. Due to this, the tool 5 attached to the tool plate 2 is pulled toward the robot arm 8 and is firmly attached to the robot arm 8 via the tool changer.

Figure 2A:
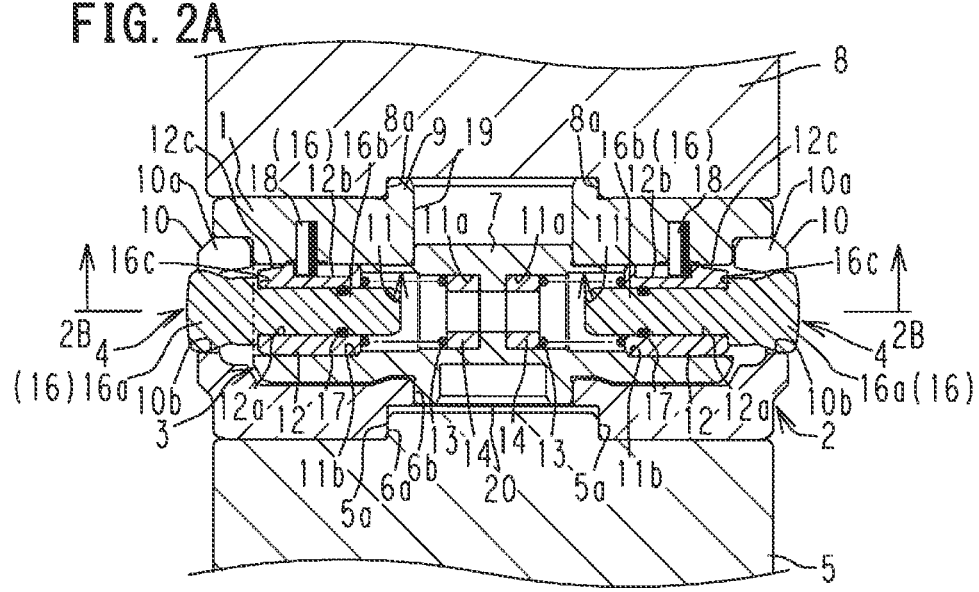
Figure 2B:
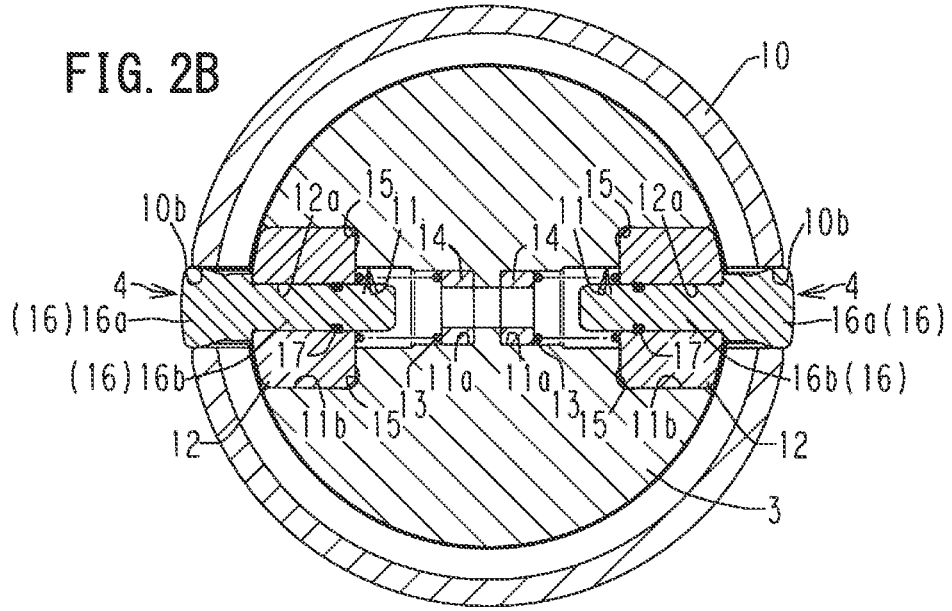
FIG. 2B is a cross section taken along a line 2B-2B in FIG. 2A.

To detach the tool 5 from the robot arm 8, the two operation pin members 4 are pushed into the housing 3 with fingers or the like against the biasing force of the springs 13, as shown in FIG. 2A and FIG. 2B. This disengages the wedge surfaces 12c from the engaging portion 10a, and the wedge members 12 are moved inward relative to (the inner peripheral surface of) the engaging portion 10a of the tubular wall portion 10. This allows the tool 5 to be detached from the robot arm 8.

Figure 3A:
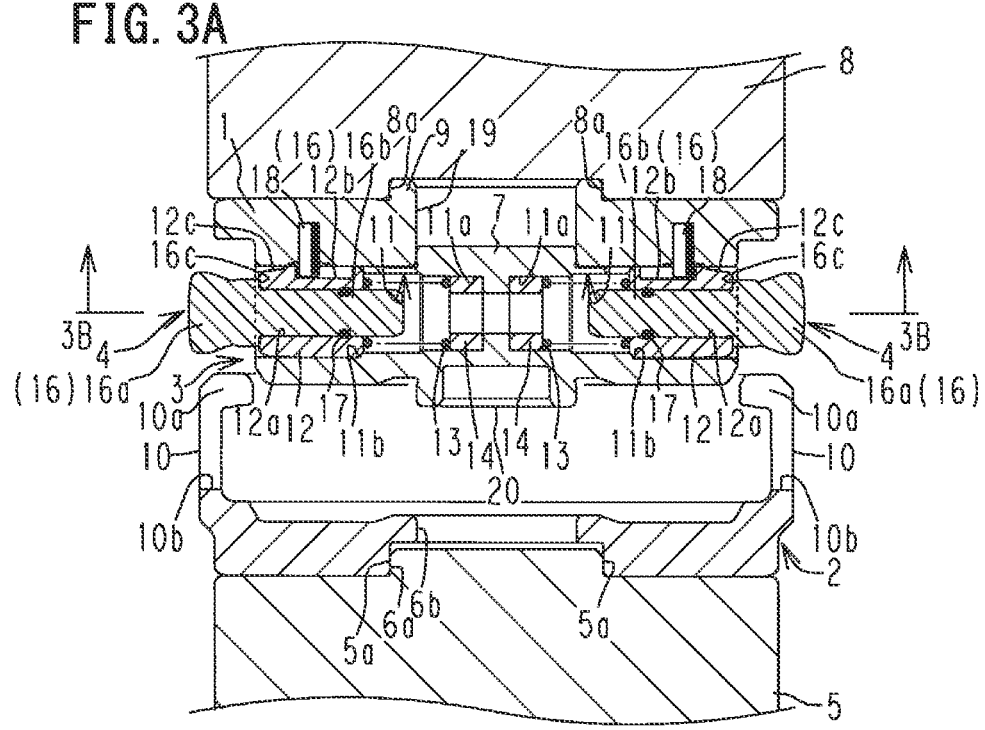
FIG. 3A is a diagram corresponding to FIG. 1A and showing a state in which the second element (tool) shown in FIG. 2A has been detached.
Figure 3B:
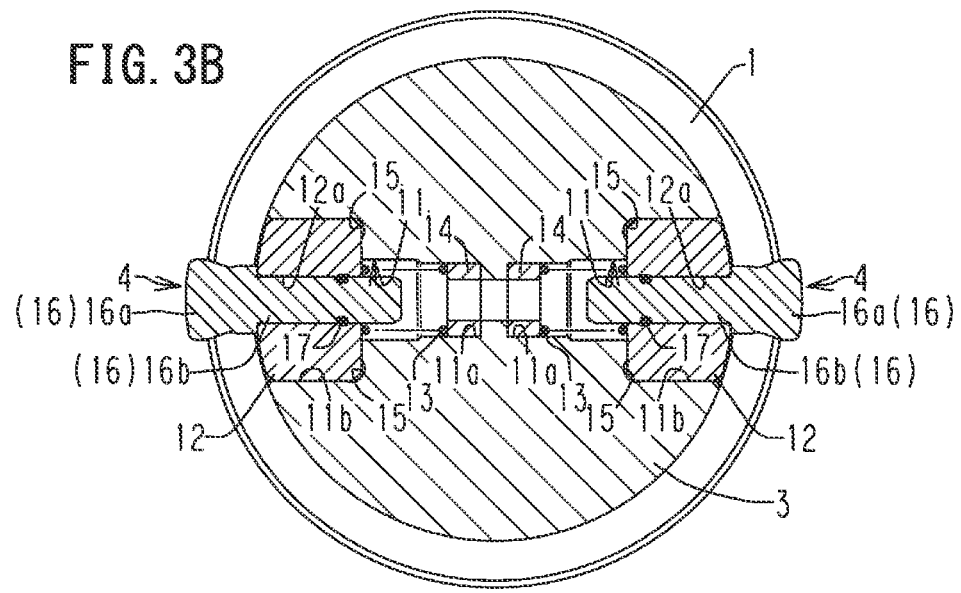
FIG. 3B is a cross section taken along a line 3B-3B in FIG. 3A.

As shown in FIG. 3A and FIG. 3B, the tool 5 is detached from the robot arm 8, for example, by lowering the tool 5 with the operation pin members 4 pushed in the housing 3. After that, the fingers are removed from the two operation pin members 4. As a result, the two operation pin members 4 are moved outward in the radial direction of the housing 3 by the biasing force of the springs 13, as shown in FIG. 4A and FIG. 4B.

To attach the tool 5 to the robot arm 8, for example, the tool plate 2 to which the tool 5 has been already attached is moved so as to cover the housing 3, while pushing the two operation pin members 4 into the housing 3 with fingers or the like against the biasing force of the springs 13. In this process, the pin hole 21 of the tool plate 2 is aligned with the positioning pin 22 protruding from the under surface of the housing 3.

After the pin hole 21 is fitted over the leading end portion 23 of the positioning pin 22 and the housing 3 is completely covered with the tool plate 2, the fingers are removed from the two operation pin members 4. As a result, the two operation pin members 4 move outward in the radial direction of the housing 3 due to the biasing force of the springs 13, and the wedge surfaces 12c of the wedge members 12 are engaged with the engaging portion 10a provided at the leading end portion of the tubular wall portion 10 of the tool plate 2, to place the device into the lock state shown in FIG. 1A and FIG. 1B.

The pin hole 21 is fitted over the leading end portion 23 of the positioning pin 22, and the hole 6b of the tool plate 2 is fitted over the protrusion 20 of the housing 3. Thus, the tool plate 2 is positioned relative to the housing 3 at two points. This makes it easier to position and attach the tool plate 2 in parallel to the housing 3. Furthermore, the pin hole 21 is fitted over the positioning pin 22, in contact with the pin 22 with respect to the circumferential direction of the tool plate 2. Due to this, the tool plate 2 is accurately positioned relative to the housing 3 at a predetermined position in a rotational direction about the axis of the housing 3.

The above-described tool changer provides the following functions and effects.

The tool changer described in Patent Literature 1 (Japanese Unexamined Patent Publication No. 2008-272875) needs a handle to change (to attach/detach) a tool. In contrast, the tool changer of the above-described embodiment needs no handle to change a tool. In addition, the tool changer includes two (a plurality of) operation pin members 4. Even if one of the operation pin members 4 hits an object and is unintentionally pushed into the housing 3 during the operation of the robot arm 8, the other operation pin member 4, which is not pushed into the housing 3, prevents the tool 5 from being detached from the robot arm 8. That is, the presence of the plurality of operation pin members 4 effectively prevents the tool 5 from being unintentionally detached from the robot arm 8.

Furthermore, the leading end portion 23 of the positioning pin 22 protruding from the under surface of the housing 3 has a shape such that: the leading end portion 23 is in contact with the inner wall surface of the pin hole 21 in the circumferential direction of the tool plate 2; and small gaps are created between the leading end portion 23 and the inner wall surface of the pin hole 21 in the radial direction of the tool plate 2. In this arrangement, when the pin hole 21 is fitted over the leading end portion 23 of the positioning pin 22, or when the leading end portion 23 of the positioning pin 22 is fitted in the pin hole 21, the leading end portion 23 of the positioning pin 22 is always in contact with the inner wall surface of the pin hole 21 in the circumferential direction of the tool plate 2. This improves therefore the accuracy of position of the tool 5 in the circumferential direction relative to the robot arm 8, at which the tool 5 is attached via the tool changer.

FIG. 7A to FIG. 11B show a second embodiment of the present invention. A tool changer of the second embodiment is structured as follows. Main differences between the first embodiment and the second embodiment are: in the second embodiment, the housing 3 and the wedge members 12 are turned upside down; and the tubular wall portion 10 is provided to the connection plate 1 functioning as the first plate, instead of the tool plate 2 functioning as the second plate.

Figure 7A:
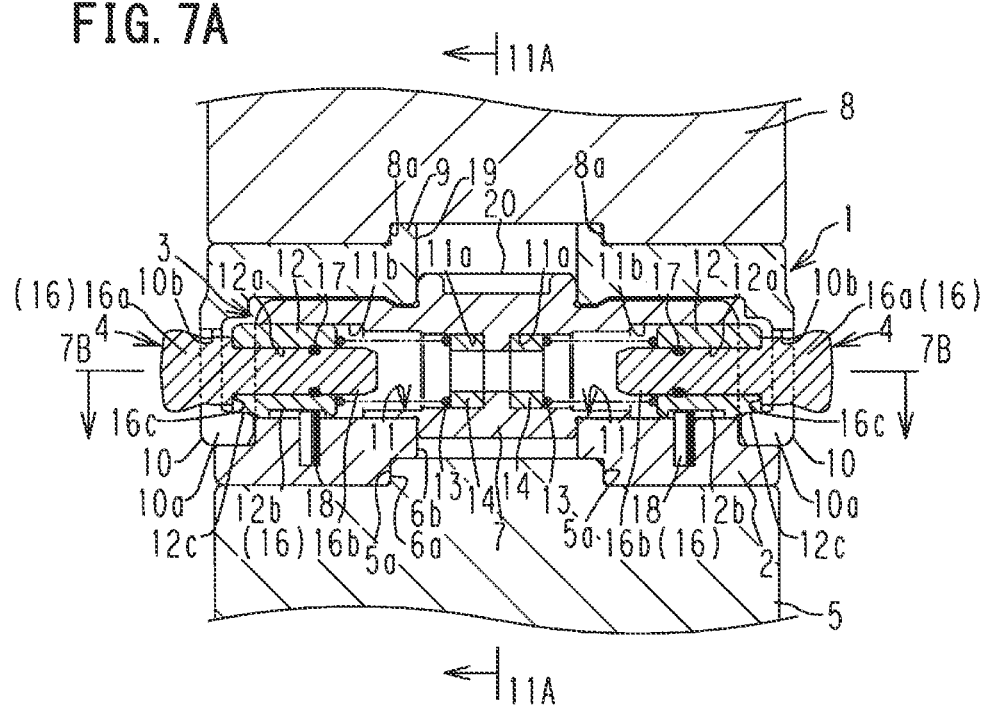
FIG. 7A shows a second embodiment of the present invention, and is a cross section of an element changer (a tool changer) along its axial direction, through which a second element (tool) has been attached to a first element (robot arm).

As shown in FIG. 7A, for example, the tool changer includes a connection plate 1, a tool plate 2, a housing 3 and a plurality of operation pin members 4.

A protrusion 9 provided at a central portion of an upper surface of the connection plate 1 is fitted in a recess 8a provided at a distal end portion of a robot arm 8, and the connection plate 1 is attached to the robot arm 8 with a bolt or the like (not shown). The connection plate 1 includes a tubular wall portion 10 extending from an outer peripheral edge portion of the connection plate 1 in its axial direction.

Meanwhile, a recess 6a provided at a central portion of a lower surface of the tool plate 2 is fitted over a protrusion 5a at a base end portion of the tool 5. The tool plate 2 has, at its central portion, a hole 6b concentric with the recess 6a. A protrusion 7 provided at a central portion of an under surface of the housing 3 is fitted in the hole 6b, and the housing 3 is attached to the tool 5 with a bolt or the like (not shown) via the tool plate 2.

The housing 3 has a diameter smaller than that of the connection plate 1. In the housing 3, there are accommodation spaces 11, in which the operation pin members 4 are respectively disposed. Each accommodation space 11 is a hollow space extending from an outer peripheral surface of the housing 3 toward a central portion of the housing 3. Each has a small-diameter portion 11a close to the central portion of the housing 3, and a widened portion 11b close to the outer peripheral surface of the housing 3. In this embodiment, two accommodation spaces 11 are arranged in a straight line. The two accommodation spaces 11 communicate with each other in this embodiment, but do not have to communicate with each other.

Each operation pin member 4 includes a wedge member 12, which is disposed in the corresponding widened portion 11b. Springs 13 (coil springs), functioning as a biasing means configured to bias the operation pin members 4 (wedge members 12) outward in the radial direction of the housing 3, are disposed in the respective accommodation spaces 11. Furthermore, a tubular spring seat 14 is disposed in each small-diameter portion 11a to receive the corresponding spring 13. Each inner-side corner portion 15 of each widened portion 11b is a hollow portion of an arc shape protruding outward.

Each operation pin member 4 includes: the wedge member 12; and an operation pin 16 inserted in a tubular hole 12a provided in the wedge member 12. The operation pin 16 includes a pin head portion 16a, a pin portion 16b having a diameter smaller than that of the pin head portion 16a, and a step portion 16c between the pin head portion 16a and the pin portion 16b. The step portion 16c prevents the corresponding wedge member 12 from falling out of the operation pin 16 in a direction toward the pin head portion 16a. An O ring 17 functioning as an annular elastic member is attached between the pin portion 16b and the wedge member 12. The O ring 17 functions to prevent the operation pin 16 from coming out of the tubular hole 12a of the wedge member 12.

Retainer pins 18 are provided to protrude from the upper surface of the tool plate 2. A head portion of each retainer pin 18 is in a groove 12b provided on an under surface of the corresponding wedge member 12. Each wedge member 12 has a wedge surface 12c provided on its under surface (surface close to the tool plate 2). The wedge surface 12c is configured to be engaged with an engaging portion 10a of the tubular wall portion 10. The engaging portion 10a is provided at a leading end portion of the tubular wall portion 10 in its axial direction and protrudes inward in the radial direction of the tubular wall portion 10.

The tubular wall portion 10 has U-shaped notches 10b. Each operation pin 16 protrudes from the housing 3 outward in its radial direction beyond the corresponding notch 10b.

Furthermore, the connection plate 1 has, at its central portion, a tubular hole 19 functioning as a recess. A protrusion 20 provided at the central portion of a top surface of the housing 3 is fitted in the tubular hole 19.

Figure 11A:
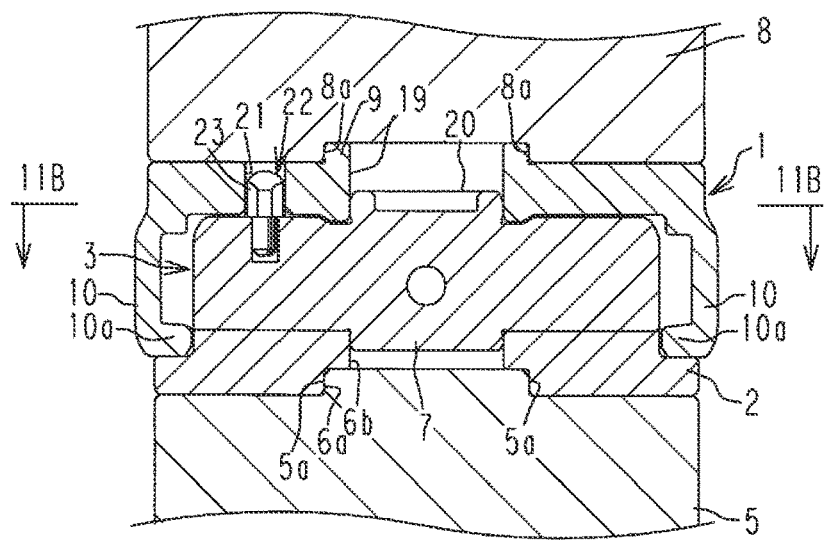
FIG. 11A is a cross section taken along a line 11A-11A in FIG. 7A.
Figure 11B:
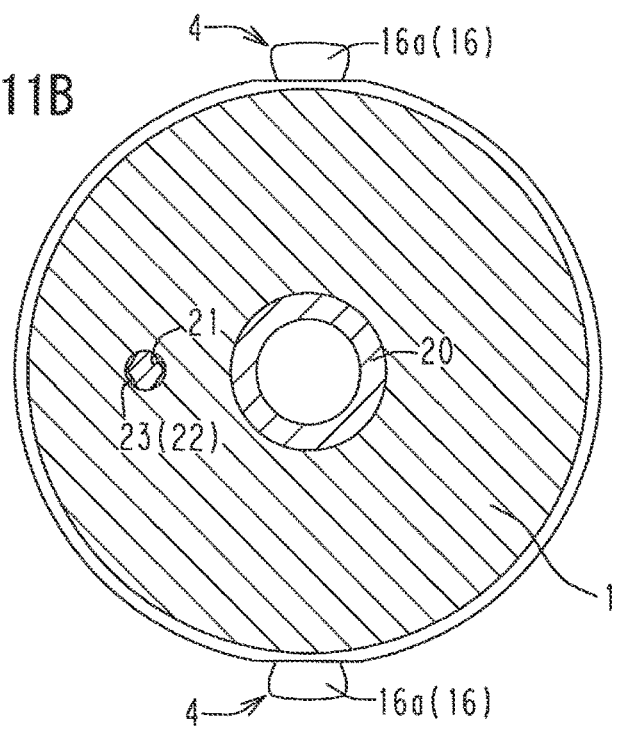
FIG. 11B is a cross section taken along a line 11B-11B in FIG. 11A.

As shown in FIG. 11A and FIG. 11B, the connection plate 1 has a pin hole 21 at a portion different from its central portion. A positioning pin 22 configured to be fitted in the pin hole 21 is provided on the top surface of the housing 3 so as to protrude.

A leading end portion 23 of the positioning pin 22 has a shape such that: its four peripheral portions are cut away; and the leading end portion 23 is in contact with an inner wall surface of the pin hole 21 in the circumferential direction of the connection plate 1 while small gaps are created between the leading end portion 23 and the inner wall surface of the pin hole 21 in a radial direction of the connection plate 1.

The tool changer having the above-described structure operates as follows.

Figure 7B:
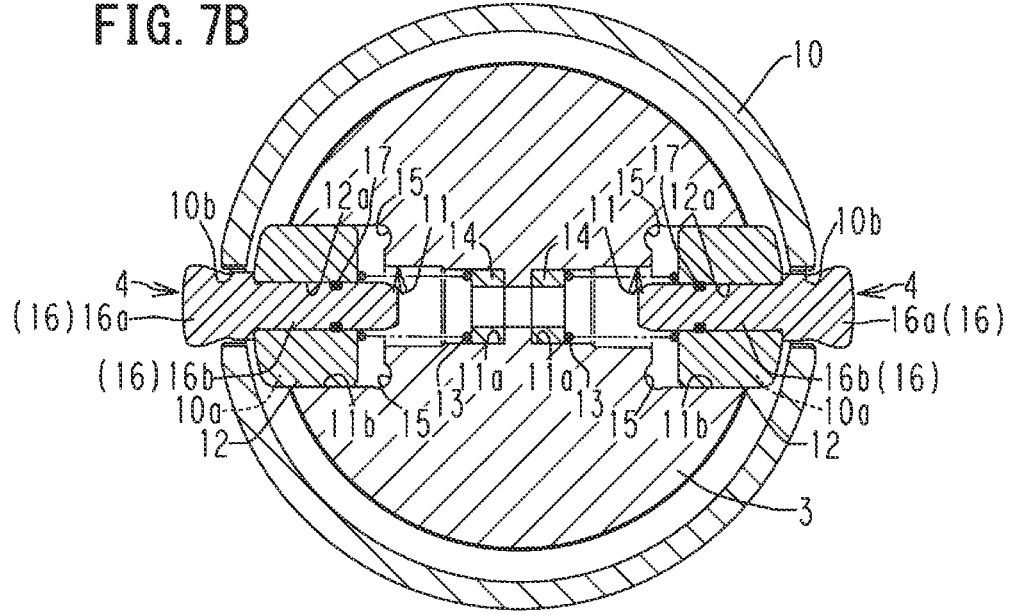
FIG. 7B is a cross section taken along a line 7B-7B in FIG. 7A.

In the lock state shown in FIG. 7A and FIG. 7B, in which the tool 5 has been attached to the robot arm 8, the two operation pin members 4 have been moved outward in the radial direction of the housing 3 by the biasing force of the springs 13, and the wedge surface 12c of each wedge member 12 is engaged with the engaging portion 10a provided at the leading end portion of the tubular wall portion 10 of the connection plate 1. In this state, the wedge surfaces 12c, inclined relative to the direction in which the springs 13 expand and contract, push the engaging portion 10a of the tubular wall portion 10 toward the tool plate 2, and the tool 5 attached to the tool plate 2 is firmly attached to the robot arm 8 via the tool changer.

Figure 8A:
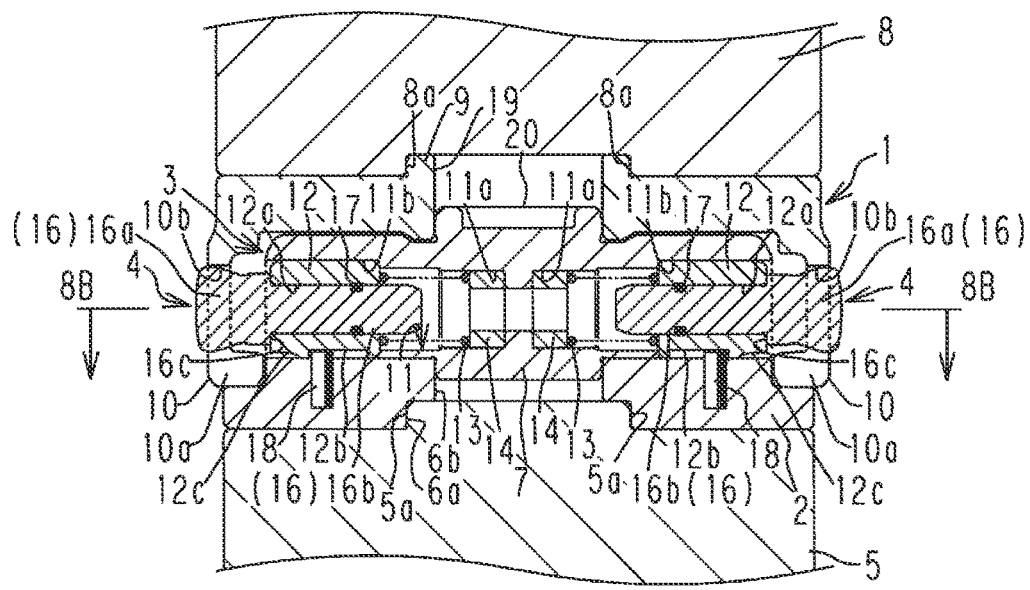
Figure 8B:
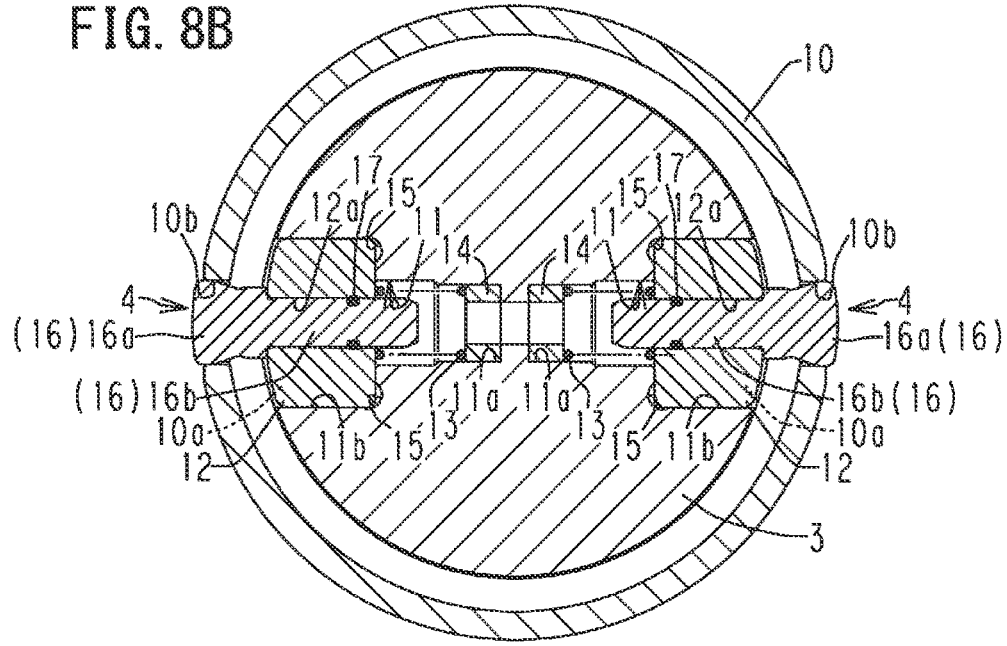
FIG. 8B is a cross section taken along a line 8B-8B in FIG. 8A.

To detach the tool 5 from the robot arm 8, the two operation pin members 4 are pushed into the housing 3 with fingers or the like against the biasing force of the springs 13, as shown in FIGS. 8A and 8B. This disengages the wedge surfaces 12c from the engaging portion 10a, and the wedge members 12 are moved inward relative to (the inner peripheral surface of) the engaging portion 10a of the tubular wall portion 10. This allows the tool 5 to be detached from the robot arm 8.

Figure 9A:
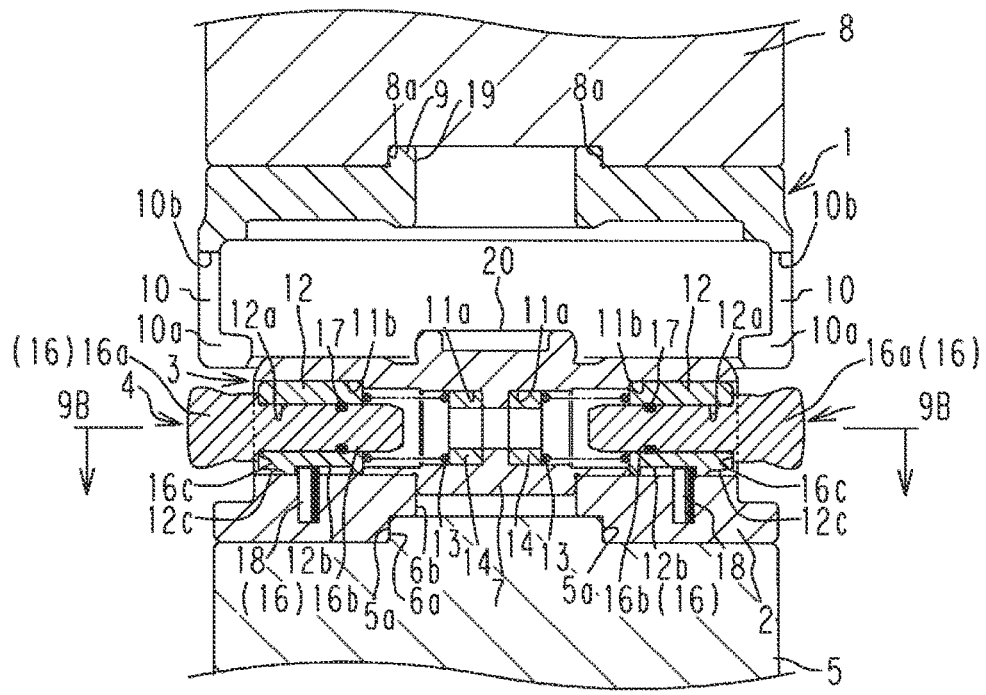
FIG. 9A is a diagram corresponding to FIG. 7A and showing a state in which the second element (tool) shown in FIG. 8A has been detached.
Figure 9B:
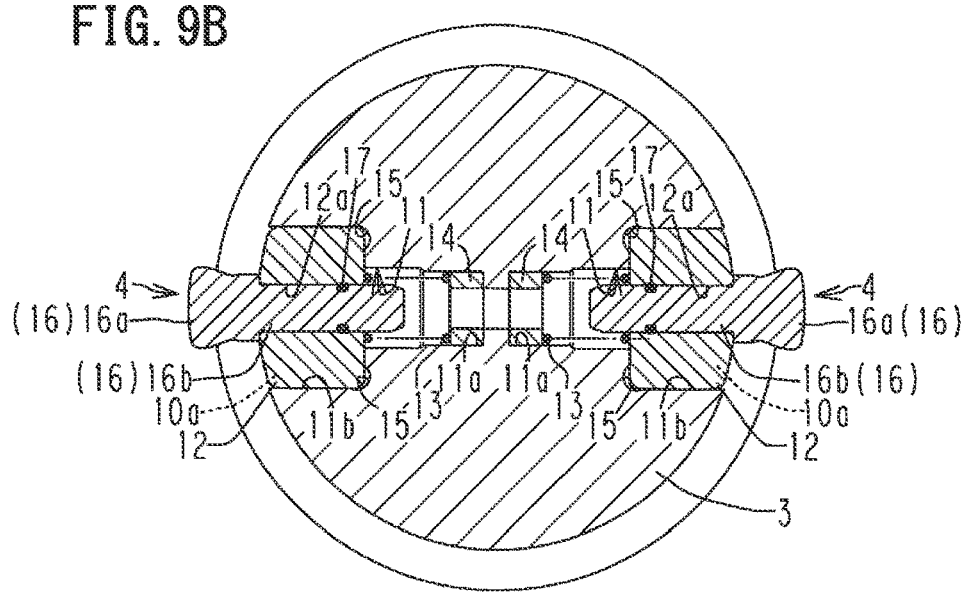
FIG. 9B is a cross section taken along a line 9B-9B in FIG. 9A.
Figure 10A:
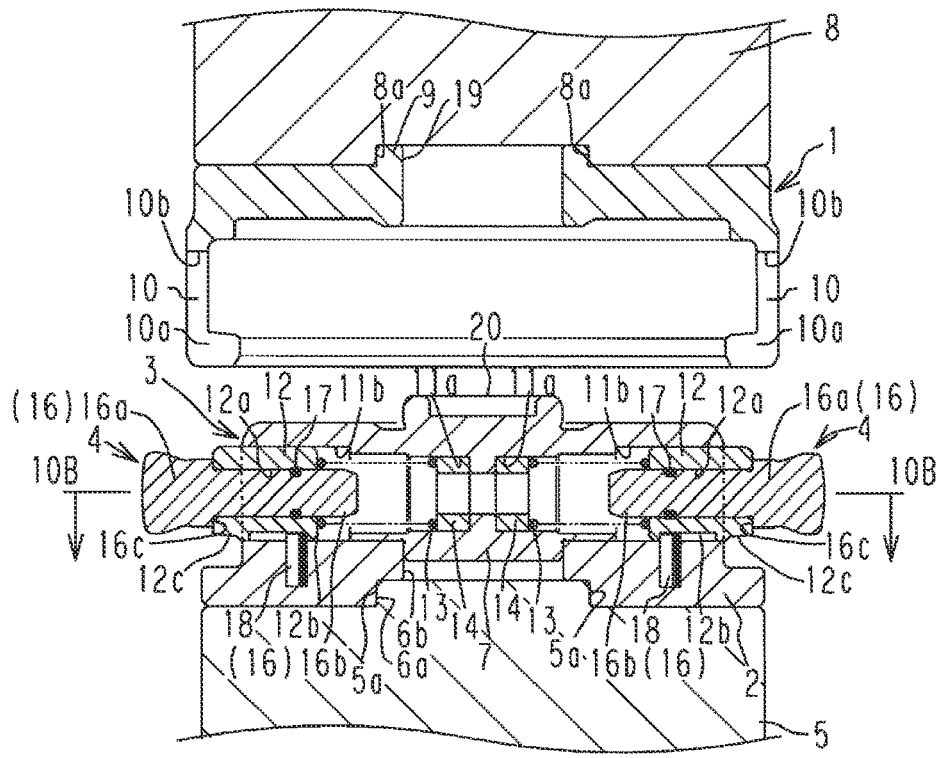
FIG. 10A is a diagram corresponding to FIG. 7A and showing a state in which the operation pin members shown in FIG. 9A have moved outward in a radial direction of a housing.
Figure 10B:
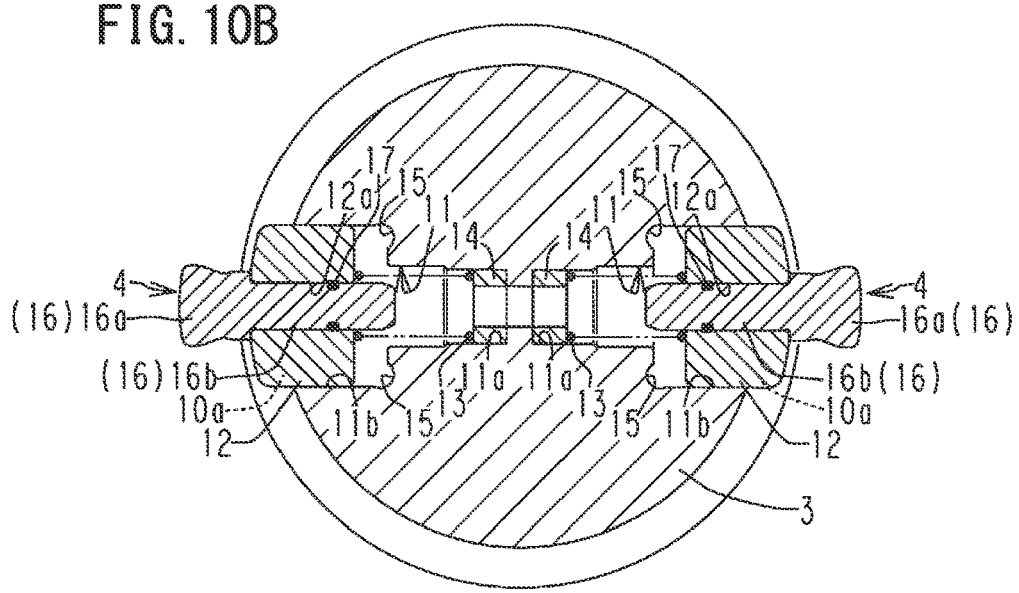
FIG. 10B is a cross section taken along a line 10B-10B in FIG. 10A.

As shown in FIG. 9A and FIG. 9B, the tool 5 is detached from the robot arm 8, for example, by lowering the tool 5 with the operation pin members 4 pushed in the housing 3. After that, the fingers are removed from the two operation pin members 4. As a result, the two operation pin members 4 are moved outward in the radial direction of the housing 3 by the biasing force of the springs 13, as shown in FIG. 10A and FIG. 10B.

To attach the tool 5 to the robot arm 8, for example, the housing 3 to which the tool 5 has been already attached via the tool plate 2 is fitted in the tubular wall portion 10 of the connection plate 1, while pushing the two operation pin members 4 into the housing 3 with fingers or the like against the biasing force of the springs 13. In this process, the positioning pin 22 protruding from the top surface of the housing 3 is aligned with the pin hole 21 of the connection plate 1.

After the leading end portion 23 of the positioning pin 22 is fitted in the pin hole 21 and after the housing 3 is fitted in the tubular wall portion 10, the fingers are removed from the two operation pin members 4. As a result, the two operation pin members 4 move outward in the radial direction of the housing 3 due to the biasing force of the springs 13, and the wedge surfaces 12c of the wedge members 12 are engaged with the engaging portion 10a provided at the leading end portion of the tubular wall portion 10 of the connection plate 1, to place the device into the lock state shown in FIG. 7A and FIG. 7B.

The leading end portion 23 of the positioning pin 22 is fitted in the pin hole 21, and the protrusion 20 of the housing 3 is fitted in the tubular hole 19 of the connection plate 1. Thus, the housing 3 is positioned relative to the connection plate 1 at two points. This makes it easier to position and attach the housing 3 in parallel to the connection plate 1. Furthermore, the positioning pin 22 is fitted in the pin hole 21, in contact with the pin hole 21 with respect to the circumferential direction of the connection plate 1. Due to this, the housing 3 is accurately positioned relative to the connection plate 1 at a predetermined position in a rotational direction about the axis of the connection plate 1.

The above-described embodiments are changeable as follows.

Figure 12A:
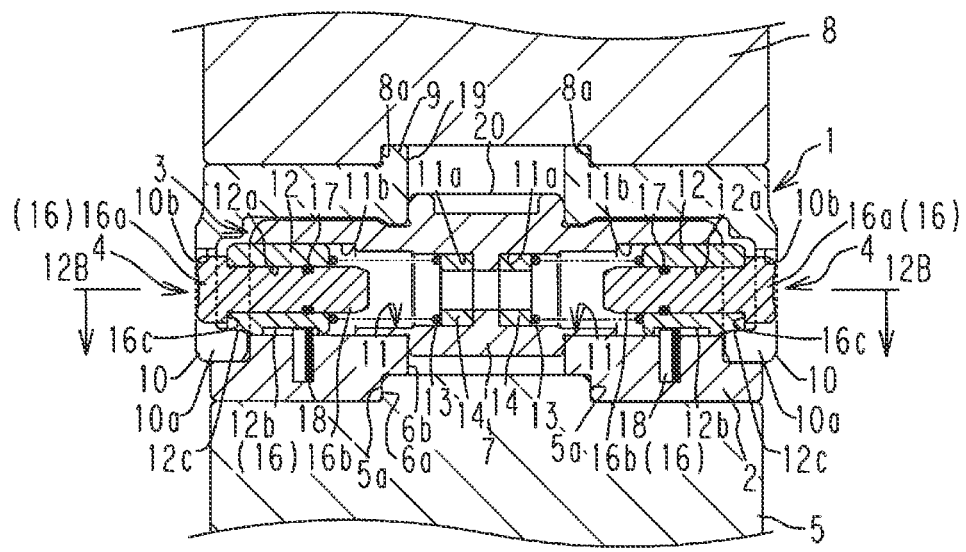
FIG. 12A is a diagram illustrating a modification of the element changer (tool changer) and corresponding to FIG. 7A.
Figure 12B:
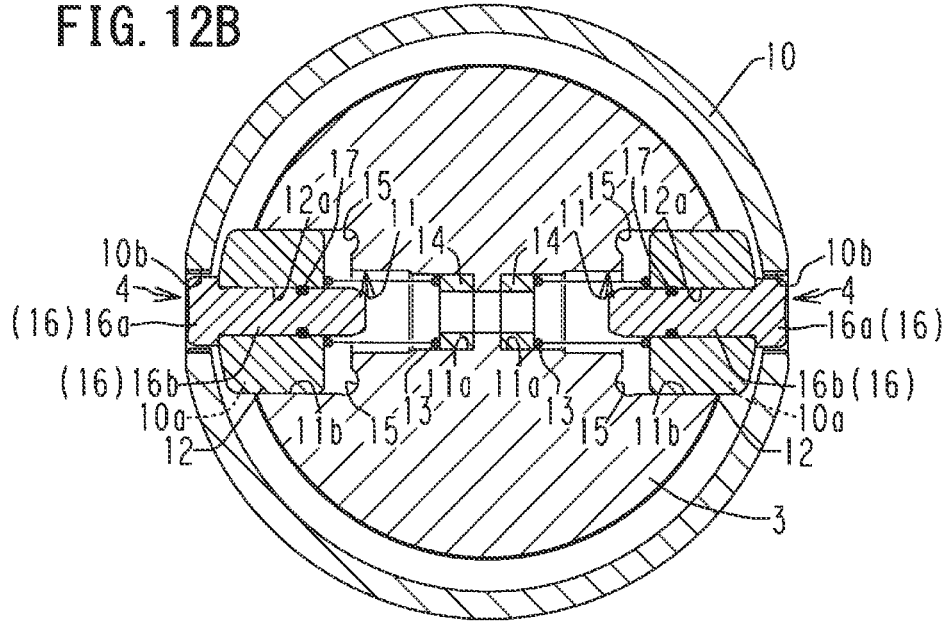
FIG. 12B is a cross section taken along a line 12B-12B in FIG. 12A.

In each of the embodiments, each operation pin member 4 is configured to protrude from the housing 3 outward in the radial direction of the housing 3 beyond the corresponding notch 10b of the tubular wall portion 10. Instead, each operation pin member 4 inserted in the housing 3 may be arranged so that its pin head portion 16a does not protrude outward beyond the corresponding notch 10b, as shown in FIG. 12A and FIG. 12B.

Figure 13:
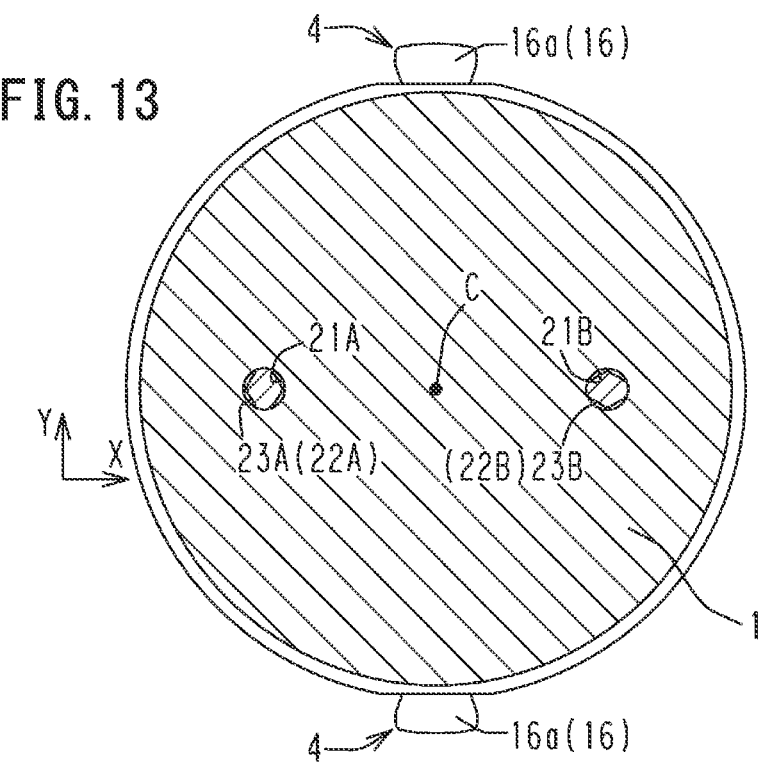
FIG. 13 is a diagram illustrating a modification of the element changer (tool changer) and corresponding to FIG. 11B.

As shown in FIG. 13, a plurality of positioning pins 22 may be provided. In this arrangement, for example, a first positioning pin 22A functions as a positioning pin with respect to Y direction (the circumferential direction of the connection plate 1 or the tool plate 2), while a second positioning pin 22B functions as a positioning pin with respect to X direction orthogonal to Y direction (a radial direction of the connection plate 1 or the tool plate 2).

A leading end portion 23A of the positioning pin 22A has a shape such that: the leading end portion 23A is in contact with an inner wall surface of a pin hole 21A in the circumferential direction of the connection plate 1 (or of the tool plate 2 in the first embodiment); and small gaps are created between the leading end portion 23A and the inner wall surface of the pin hole 21A in the radial direction of the connection plate 1 (or of the tool plate 2 in the first embodiment). A leading end portion 23B of the positioning pin 22B has a shape such that: the leading end portion 23B is in contact with an inner wall surface of a pin hole 21B in the radial direction of the connection plate 1 (or of the tool plate 2 in the first embodiment); and small gaps are created between the leading end portion 23B and the inner wall surface of the pin hole 21B in the circumferential direction of the connection plate 1 (or of the tool plate 2 in the first embodiment).

The protrusion 20 does not have to be provided, as shown in FIG. 13. A reference numeral C represents the center of the connection plate 1.

Instead of the arrangement in which the positioning pin(s) 22, 22A and 22B is/are provided to the housing 3 and the pin hole(s) 21, 21A and 21B is/are provided in the connection plate 1 or the tool plate 2, the following arrangement is also possible: the positioning pin(s) 22, 22A and 22B is/are provided to the connection plate 1 or the tool plate 2, and the pin hole(s) 21, 21A and 21B is/are provided in the housing 3.

In each of the above embodiments, the two operation pin members 4 are disposed at intervals of (or with a phase difference of) 180 degrees in the circumferential direction of the tool changer. The interval (or the phase difference) between the two operation pin members 4 in the circumferential direction of the housing 3 (or of the tool changer) is not limited to 180 degrees. The two operation pin members 4 may be disposed at an interval of (or with a phase difference of) 90 or 120 degrees, for example.

Three or more operation pin members 4 may be disposed.

Each operation pin member 4 does not have to be made of separate components such as the wedge member 12 and the operation pin 16. Each operation pin member 4 may be a unitary member made of one material and formed as an operation pin member including a wedge portion.

Without using the O ring 17 as a retainer, each operation pin 16 may be pressed into the tubular hole 12a of the corresponding wedge member 12.

The connection plate 1, tool plate 2 and housing 3 each has a circular shape in plan view. Instead of the circular shape, each may have a polygonal shape such as a quadrangle, an elliptical shape, or the like.

The protrusion 7 and/or the protrusion 20 do not have to be provided at the central portions, as long as the device is configured so that the axis of the recess 8a of the robot arm 8 can be finally aligned with the axis of the protrusion 5a of the tool 5.

The second element, which is an element to be detached, may be an object subjected to a machining process, instead of the tool 5 such as a machine tool, clamp, pallet and jig. Furthermore, instead of the robot arm 8, the first element may be a movable portion of a conveyor machine or a table functioning as a stationary stand.

Embodiments of the present invention have been hereinabove described. It is a matter of course that other changes or alterations can be made on the present invention within the scope of envisagement of one skilled in the art.

REFERENCE SIGNS LIST

1: connection plate (first plate); 2: tool plate (second plate); 3: housing; 4: operation pin member; 5: tool (second element); 6b: hole (recess); 8: robot arm (first element); 10: tubular wall portion; 10a: engaging portion; 12: wedge member; 12a: tubular hole; 12c: wedge surface; 13: spring (biasing means); 16: operation pin; 17: O ring (elastic member) 19: tubular hole (recess); 20: protrusion; 21: pin hole; 22: positioning pin; 23: leading end portion.

The invention claimed is:

1. An element changer comprising:
a first plate (1) configured to be attached to a first element (8);
a second plate (2) configured to be attached to a second element (5), the second plate (2) including a tubular wall portion (10) extending from an outer peripheral edge portion of the second plate (2) in its axial direction;
a housing (3) configured to be attached to the first element (8) via the first plate (1), the housing (3) having a diameter smaller than that of the second plate (2);
a plurality of operation pin members (4) inserted in the housing (3), each of the pin members (4) having a wedge surface (12c) on a side close to the first plate (1); and
a biasing means (13) provided in the housing (3), the biasing means (13) being configured to bias the operation pin members (4) outward in a radial direction of the housing (3),
wherein:
an engaging portion (10a) is provided at a leading end portion of the tubular wall portion (10) in its axial direction, the engaging portion (10a) protruding inward in a radial direction of the tubular wall portion (10);
in a side surface of the tubular wall portion (10), a U-shaped notch (10b) is formed;
the operation pin members (4) protrude from the housing (3) outward in a radial direction of the housing (3) beyond the notch (10b); and
when the operation pin members (4) are pushed into the housing (3) against a biasing force of the biasing means (13), each wedge surface (12c) is disengaged from the engaging portion (10a), to allow the second element (5) to be detached from the first element (8).

2. The element changer according to claim 1, wherein:
a protrusion (20) is provided at a central portion of the housing (3);
a recess (6b), in which the protrusion (20) is to be fitted, is provided at a central portion of the second plate (2); and
a positioning pin (22) configured to be fitted in a pin hole (21) of the second plate (2) is provided so as to protrude from the housing (3), the pin hole (21) being provided at a portion of the second plate (2), which is not its central portion.

3. The element changer according to claim 2, wherein a leading end portion (23) of the positioning pin (22) has a shape such that: when fitted in the pin hole (21), the leading end portion (23) is in contact with an inner wall surface of the pin hole (21) in a circumferential direction of the second plate (2); and one or more gaps are created between the leading end portion (23) and the inner wall surface of the pin hole (21) in a radial direction of the second plate (2).

4. An element changer comprising:
a first plate (1) configured to be attached to a first element (8), the first plate (1) including a tubular wall portion (10) extending from an outer peripheral edge portion of the first plate (1) in its axial direction;
a second plate (2) configured to be attached to a second element (5);
a housing (3) configured to be attached to the second element (5) via the second plate (2), the housing (3) having a diameter smaller than that of the first plate (1);
a plurality of operation pin members (4) inserted in the housing (3), each of the pin members (4) having a wedge surface (12c) on a side close to the second plate (2); and
a biasing means (13) provided in the housing (3), the biasing means (13) being configured to bias the operation pin members (4) outward in a radial direction of the housing (3),
wherein:
an engaging portion (10a) is provided at a leading end portion of the tubular wall portion (10) in its axial direction, the engaging portion (10a) protruding inward in a radial direction of the tubular wall portion (10);
in a side surface of the tubular wall portion (10), a U-shaped notch (10b) is formed;
the operation pin members (4) protrude from the housing (3) outward in a radial direction of the housing (3) beyond the notch (10b); and
when the operation pin members (4) are pushed into the housing (3) against a biasing force of the biasing means (13), each wedge surface (12c) is disengaged from the engaging portion (10a), to allow the second element (5) to be detached from the first element (8).

5. The element changer according to claim 4, wherein:
a protrusion (20) is provided at a central portion of the housing (3);
a recess (19), in which the protrusion (20) is to be fitted, is provided at a central portion of the first plate (1); and a positioning pin (22) configured to be fitted in a pin hole (21) of the first plate (1) is provided so as to protrude from the housing (3), the pin hole (21) being provided at a portion of the first plate (1), which is not its central portion.

6. The element changer according to claim 5, wherein a leading end portion (23) of the positioning pin (22) has a shape such that: when fitted in the pin hole (21), the leading end portion (23) is in contact with an inner wall surface of the pin hole (21) in a circumferential direction of the first plate (1); and one or more gaps are created between the leading end portion (23) and the inner wall surface of the pin hole (21) in a radial direction of the first plate (1).

7. The element changer according to claim 1, wherein each of the operation pin members (4) includes:

a wedge member (12) on which the wedge surface (12*c*) is provided;

an operation pin (16) inserted in a tubular hole (12*a*) provided in the wedge member (12); and an O-ring (17) attached between the operation pin (16) and the wedge member (12).

8. The element changer according to claim 4, wherein each of the operation pin members (4) includes:

a wedge member (12) on which the wedge surface (12*c*) is provided;

an operation pin (16) inserted in a tubular hole (12*a*) provided in the wedge member (12); and an O-ring (17) attached between the operation pin (16) and the wedge member (12).

* * * * *